United States Patent [19]
Katbi et al.

[11] Patent Number: 5,584,616
[45] Date of Patent: *Dec. 17, 1996

[54] CUTTING INSERT

[75] Inventors: Karl Katbi, Troy; Brendan Brockett, Dearborn Hts., both of Mich.

[73] Assignee: Valenite Inc., Madison Heights, Mich.

[ * ] Notice: The portion of the term of this patent subsequent to Aug. 9, 2014, has been disclaimed.

[21] Appl. No.: 563,738

[22] Filed: Nov. 28, 1995

Related U.S. Application Data

[63] Continuation of Ser. No. 288,094, Aug. 9, 1994.

[51] Int. Cl.⁶ .................................................. B23B 27/22
[52] U.S. Cl. ................................................. 407/114; 407/2
[58] Field of Search ........................... 407/113, 114, 407/115, 116, 100

[56] References Cited

U.S. PATENT DOCUMENTS

| | | | |
|---|---|---|---|
| 4,318,644 | 3/1982 | Seidel | 407/114 |
| 4,993,892 | 2/1991 | Takahashi | 407/114 |
| 5,222,843 | 6/1993 | Katbi et al. | 407/114 |
| 5,249,894 | 10/1993 | Bernadic et al. | 407/114 |
| 5,265,985 | 11/1993 | Boppana et al. | 407/114 |
| 5,330,296 | 7/1994 | Beeghly et al. | 407/114 |
| 5,372,463 | 12/1994 | Takahashi et al. | 407/115 X |
| 5,456,557 | 10/1995 | Bernadic et al. | 407/114 |

*Primary Examiner*—M. Rachuba
*Assistant Examiner*—Henry Tsai
*Attorney, Agent, or Firm*—Mary K. Cameron

[57] ABSTRACT

An indexable cutting insert having a polygonal body including top and bottom surfaces connected by a peripheral wall having sides and corners. In a generally diamond shaped embodiment, opposite corners and the adjacent sides form cutting edges at their junctures with the top surface, forming noses at the corners. A chip groove formed on the top surface includes a pair of cutting faces, sloping downwardly from respective sides to a radius blend juncture aligned with the nose and bisecting the adjacent sides. A pair of chipbreaker faces slope upward from respective ones of the cutting faces and backward from a ridge that connects the chipbreaker faces and is upwardly aligned with the juncture of the cutting faces. The chipbreaker faces preferably have a double curvature (1) outward from the ridge and (2) upward from radius blend junctures with their adjoining cutting faces. The upward curvature is preferably a radius that slopes upwardly at a declining rate with increasing distance from the respective cutting face junctures. A third cutting face at the nose adjoins the side connected faces preferably at a common angle. Various additional features are also disclosed.

11 Claims, 1 Drawing Sheet

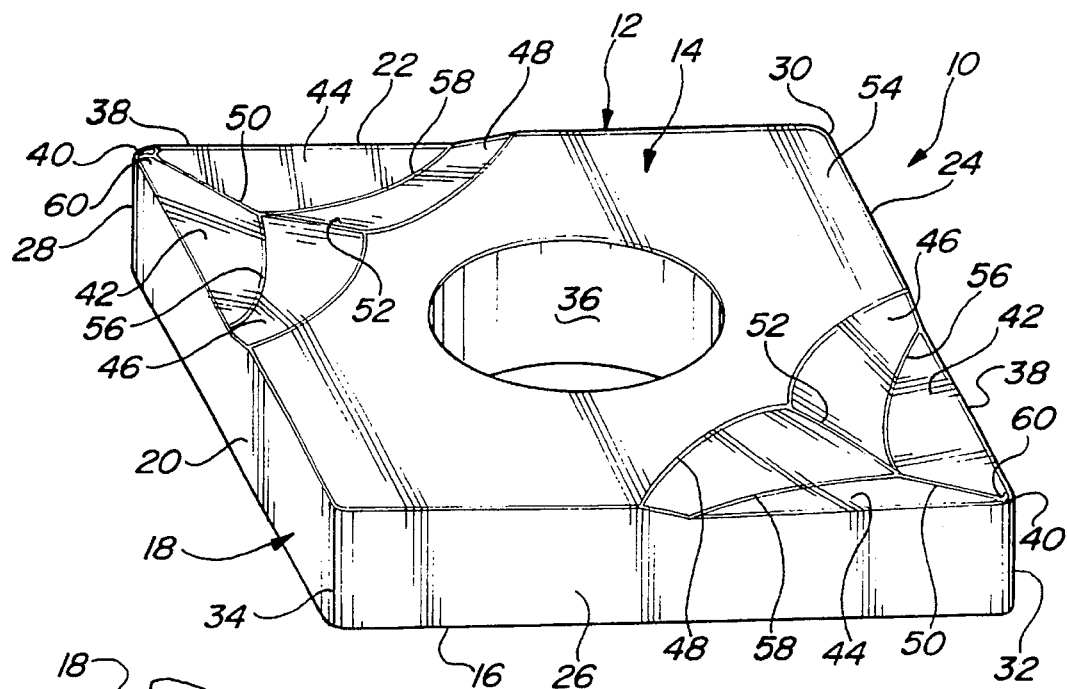
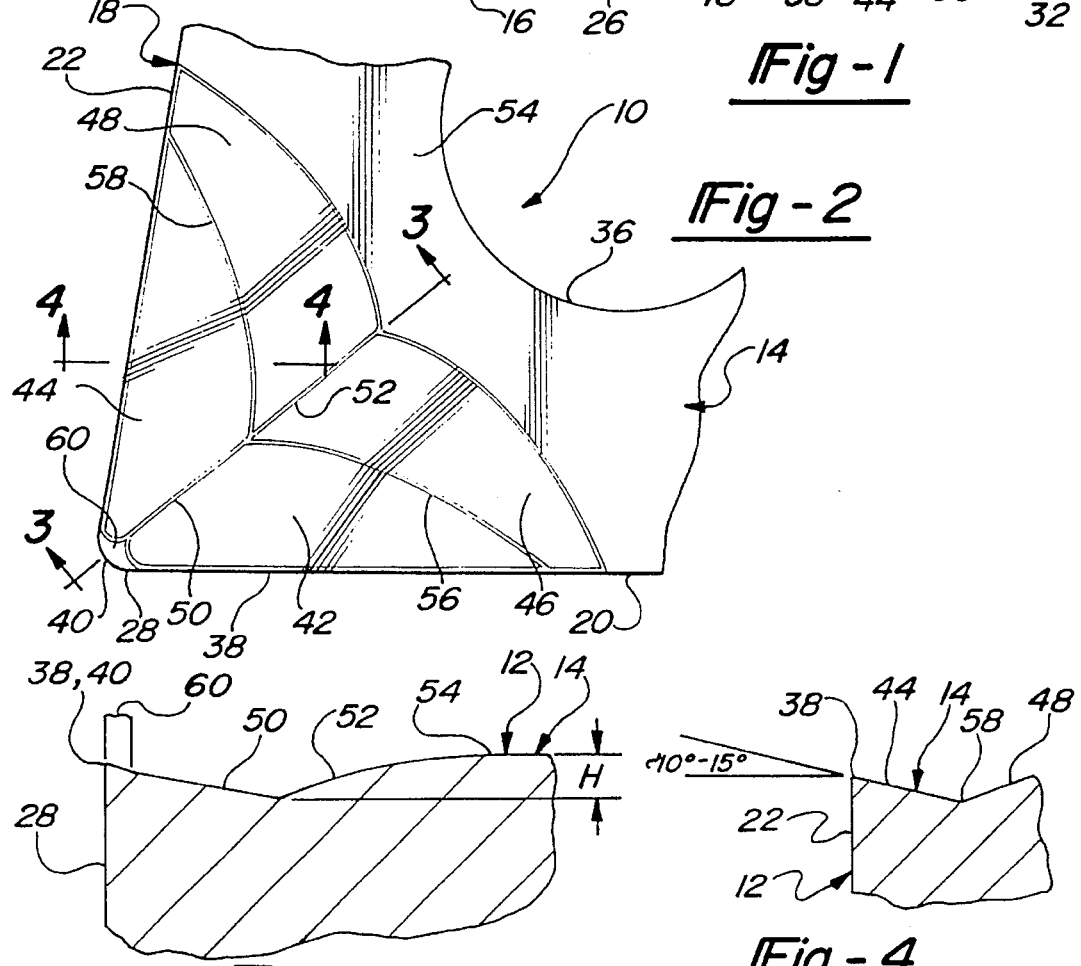

CUTTING INSERT

This is a continuation of U.S. patent application Ser. No. 08/288,094, filed Aug. 9, 1994.

FIELD OF THE INVENTION

This invention relates to cutting inserts for metal cutting and, more particularly, to a cutting insert having a chip control geometry with improved features.

BACKGROUND OF THE INVENTION

It is known in the art relating to metal cutting to use disposable cutting inserts which are detachably clamped on a holder and discarded when they become dull or chipped. Throw away inserts are usually reversible so that an insert can be provided with at least two cutting edges for selective presentation of the cutting edges to the cutting position.

It is desired to provide new small nose radius inserts of this type having chip grooves designed to control chips at very light feeds and depths of cut and eliminate part distortion when machining thin walled parts and to provide enhanced chip control.

SUMMARY OF THE INVENTION

The present invention provides a small nose radius cutting insert having pressed in chip groove designs which provide a positive cutting angle of cutting surfaces on the rake face, along with a small nose radius. The combination helps reduce radial cutting force and heat generated when machining high temperature alloy materials requiring good surface finish and close part tolerances. Recommended uses include turning and profiling of low carbon steels, stainless steels, and high temperature alloy materials at low to moderate cutting speeds, very shallow depths of cut and very low feed rates.

The chip grooves are designed to increase the life of the cutting tool by controlling the removed work piece material into forming small manageable coils that flow away from the work piece and break as a result of hitting the tool holder or machine turret. The designs are two handed so that they can be used for turning and profiling in both directions. While the inserts must be ground to maintain a required precision tolerance, slight misalignment during the grinding process will not adversely affect the machining performance since the chip breaker does not have a fixed land around its cutting edge, but is consistent from its cutting edge to the bottom.

It is therefore a feature of the invention to provide a double positive cutting angle, including a cutting edge extending from a corner radius along both adjacent sides of the insert. A positive shear angle is provided to the cutting faces on the rake face, which helps enhance the small force distribution and initiates chip breaking by directing and bending the work piece material toward the center of the chip breaker form and away from the work piece. A radius blend at the bottom of the intersecting cutting faces provides the cutting insert with maximum chip control performance at very low feed rates and depths of cut.

A further feature of the invention is a substantial chipbreaker height from the bottom of the chip groove to a plateau on the top of the insert. This combined with the positive shear angle of cutting faces on the rake face directs the work piece material to flow down and away from the work piece and aids in chip control. This V type chip groove prevents the machined material from sliding past the trailing edge of the chip groove during light feeds and depths of cut.

Another feature of the invention is that winglike chip breaker faces are provided which angle upwardly and rearwardly from a ridge aligned with the nose of the insert to aid in directing chips away from the work piece. Preferably, the chipbreaker faces have a double curvature, including an outwardly curving juncture with the cutting faces and an upwardly and rearwardly curving surface formed as a radius in the vertical direction.

These and other features and advantages of the invention will be more fully understood from the following detailed description of the invention taken together with the accompanying drawings.

BRIEF DESCRIPTION OF THE DRAWINGS

In the drawings:

FIG. 1 is a perspective view of a cutting insert made in accordance with the present invention;

FIG. 2 is a plan view of the insert of FIG. 1;

FIG. 3 is a cross-sectional view through the nose of the cutting edge taken in the plane indicated by the line 3—3 of FIG. 2; and FIG. 4 is a cross-sectional view through the cutting edge taken in the plane indicated by the line 4—4 of FIG. 2.

DETAILED DESCRIPTION OF THE INVENTION

Referring now to the drawings in detail, numeral 10 generally indicates an indexable cutting insert for use with cutting tools for turning or profiling of low carbon steels, stainless steels, and high-temperature alloy materials at low to moderate cutting speeds, shallow depths of cut and low feed rates.

As illustrated in FIGS. 1 thru 4, insert 10 includes a generally polygonal body 12 having top and bottom surfaces 14, 16 respectively connected by a peripheral wall 18. The peripheral wall 18 is generally diamond shaped and includes four sides, 20, 22, 24, 26 connected by four radiused corners 28, 30, 32, 34. A central opening 36 is provided through the insert for securing it to a tool holder or machine turret.

The opposite corners 28, 32 comprise the sharper acutely angled corners of the diamond shaped insert. At these corners, 28, 32, the corners and the adjacent sides of the peripheral wall form a pair of first junctures with the top surface 14 to define cutting edges 38, each having a nose 40 at its respective radiused corner. Inwardly of each cutting edge 38, the top surface 14 defines a chip groove including left and right hand cutting faces 42, 44, respectively, and a pair of associated chipbreaker faces 46, 48.

The left hand and right hand cutting faces 42, 44 each slope downwardly (FIG. 4) defining a positive cutting angle, from the portion of the cutting edge 38 defined by the associated side of the insert to a second juncture formed as a small radius blend 50 that is aligned with the associated nose and bisects the adjacent sides. The chipbreaker faces 46, 48 each slope upward from an associated one of the cutting faces 42, 44 and laterally backward from a ridge 52 connecting the chipbreaker faces and aligned in an upward direction with the radius blend 50. The chipbreaker faces 46, 48 extend upwardly to a plateau 54 of the body top surface which is substantially higher than the cutting edge 38. At their lower edges the chipbreaker faces connect with their respective cutting faces at 3rd and 4th junctures which, again, are formed as small radius blends 56, 58.

Preferably the cutting edge 38 is further defined by a third cutting face 60, adjoining the cutting faces 42, 44 and sloping downwardly from the nose 40 of the cutting edge to the outer end of the radius blend 50. The third (nose) cutting face 60 and the adjoining side-connected cutting faces 42, 44 preferably slope downwardly at a common angle of between about 10 and 15 degrees. In the illustrated embodiment, the angle is about 13 degrees and is selected to provide a desired condition of reduced radial force and heat generation together with long tool life and chip control. Also, the radius blends 50, 56, 58 are suitably formed with radii within a range of about 0.005 to 0.050 inch, preferably, about 0.010 inch radius.

The chipbreaker faces 46, 48, as shown, have a double curvature. This includes first a winglike curvature outward and backward from the ridge 52 to the adjacent sides of the insert. The faces 46, 48 also slope upwardly from the radius blends 56, 58 to the plateau 54 which forms the highest portion of the upper surface of the insert. As is best seen in FIGS. 3 and 4, the chipbreaker faces 46, 48 are also curved in an upward direction, having a slope which decreases with the distance from the radius blends 56, 58. The upward curvature is defined by a radius which falls within a range from about 10 to about 50 times the vertical distance H (FIG. 3) from the lowest portion of the chip groove at the radius blends 56, 58 to the plateau 54. In the illustrated embodiment, the upwardly extending radius of the chipbreaker faces is 0.250 inches. The various dimensions of the illustrated embodiment can, of course, be varied to suit the varying materials, speeds and cuts to which cutting inserts according to the invention may be applied.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An indexable cutting insert comprising:
   a generally polygonal body including top and bottom surfaces connected by a peripheral wall with sides and corners, at least one of said corners being radiused and defining with the adjacent sides a cutting edge at a first juncture with the top surface, the cutting edge forming a nose at the radiused corner; and
   a chip groove formed on the top surface extending inwardly from the cutting edge, the chip groove including a pair of cutting faces each sloping downwardly from one of the adjacent sides to a second juncture aligned with the nose and bisecting the adjacent sides, and a pair of chipbreaker faces, each sloping upward from one of the cutting faces and backward from a ridge connecting the chipbreaker faces and upwardly aligned with said second juncture, the chipbreaker faces extending to a plateau of the body top surface higher than the cutting edge and connecting with their respective cutting faces at respective third and fourth junctures and having a double curvature, curving outwardly from the second juncture to the respective cutting edges and curving upwardly to the plateau from the third and fourth junctures, the slope of said upward curve decreasing with increasing distance from the third and fourth junctures.

2. The invention of claim 1 and further comprising a third cutting face adjoining said pair of cutting faces and sloping downwardly from the nose to said second juncture.

3. The invention of claim 2 wherein said cutting faces slope downwardly at a common angle.

4. The invention of claim 3 wherein said angle is between 10 and 15 degrees.

5. The invention of claim 3 wherein said angle is about 13 degrees.

6. The invention of claim 1 wherein said second, third and fourth junctures comprise radius blends.

7. The invention of claim 6 wherein said radius blends fall within a range of 0.005–0.050 inch radius.

8. The invention of claim 6 wherein said radius blends are about 0.010 inch radius.

9. The invention of claim 1 wherein said chipbreaker faces lie closest to said nose at said connecting ridge and curve outwardly therefrom to said adjacent sides.

10. The invention of claim 1 wherein the upward curvature of said chipbreaker faces is defined by a radius in a range from 10 to 50 times the vertical distance from said third and fourth junctures to said plateau of the body top surface.

11. The invention of claim 1 wherein said body is generally diamond shaped having opposite acutely angled corners both radiused and defining cutting edges, one said chip groove being formed adjacent each of said acutely angled corners.

\* \* \* \* \*